Dec. 18, 1962   R. A. MATHEISEL ET AL   3,069,028
STORES LOADING AT SEA

Filed Jan. 14, 1958   5 Sheets-Sheet 1

INVENTORS
RUDOLPH A. MATHEISEL
CARROLL H. MATSON
JAMES G. JOHNSTON
OSMOND F. FIELDS

BY

ATTORNEYS

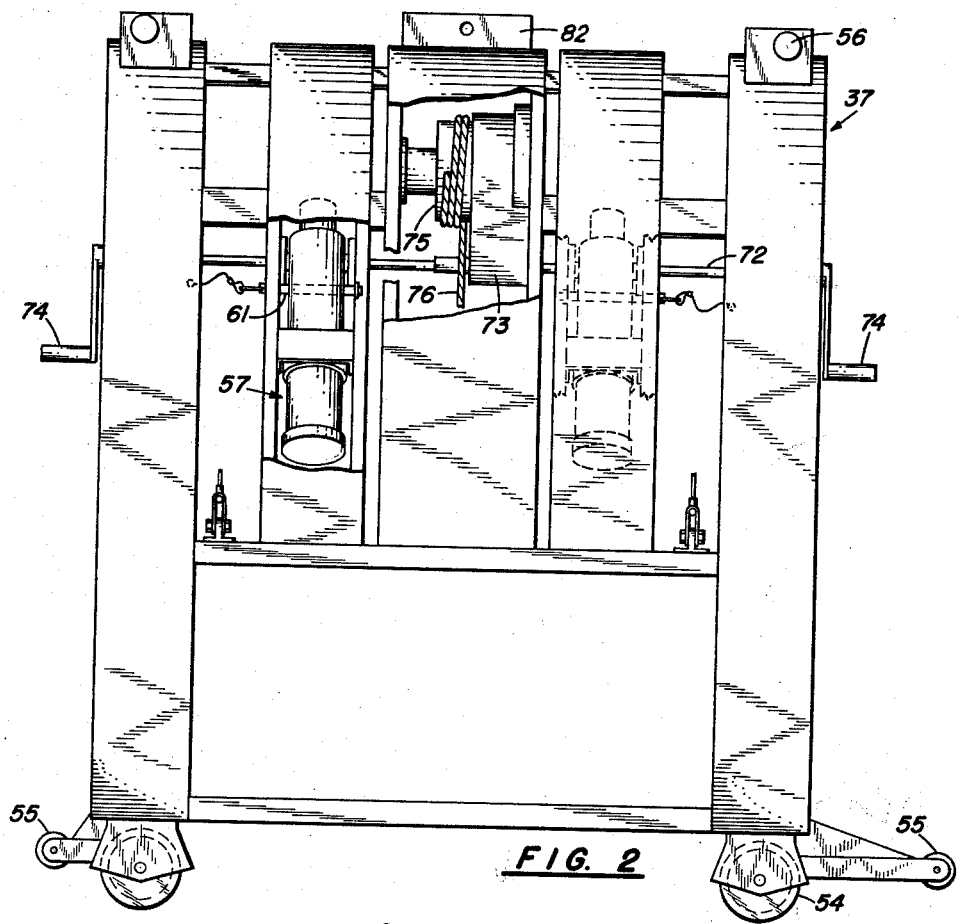
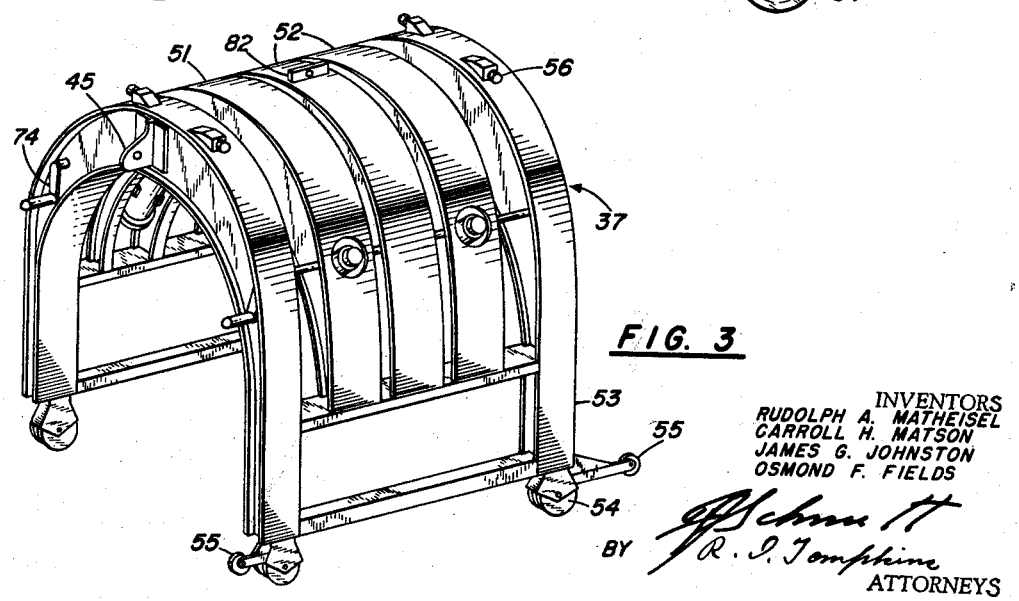

INVENTORS
RUDOLPH A. MATHEISEL
CARROLL H. MATSON
JAMES G. JOHNSTON
OSMOND F. FIELDS

ATTORNEYS

INVENTORS
RUDOLPH A. MATHEISEL
CARROLL H. MATSON
JAMES G. JOHNSTON
OSMOND F. FIELDS
BY
ATTORNEYS 3,069,028
STORES LOADING AT SEA
Rudolph A. Matheisel, Baltimore, Md., Carroll H. Matson and James G. Johnston, Orlando, Fla., and Osmond F. Fields, Baltimore, Md.; said Matson, Johnston, and Fields assignors of three-fourths to the United States of America as represented by the Secretary of the Navy
Filed Jan. 14, 1958, Ser. No. 709,726
(Filed under Rule 47(a) and 35 U.S.C. 116)
7 Claims. (Cl. 214—15)

The present invention relates to a method of and apparatus for loading a water vessel and more particularly to an apparatus for loading a water vessel.

During wartime, small water vessels, such as seaplanes, are used quite extensively. If the seaplane can return to its home base, there generally is no problem in reloading it due to the loading equipment available on the docks.

However, when the seaplane is reloaded at sea where the dock loading equipment is not available, either the loading equipment must be provided on a ship which reloads the seaplane or the seaplane must carry its own loading equipment. If a ship carries the loading equipment, the seaplane would have to taxi up alongside the ship in order to be reloaded: this would create a very dangerous condition unless the water is calm, as the seaplane would be in constant danger of being smashed against the ship as a result of the waves.

In order to avoid this danger, it has been suggested that seaplanes carry their own loading equipment. However, the known loading systems carried by seaplanes to reload them while afloat are not practical as they weigh too much and can not reload a seaplane in the short time required under wartime conditions.

This application relates to a loading apparatus shown more generally in an application by Rudolph A. Matheisel, Serial No. 654,975, filed April 24, 1957, now Patent #2,865,518, patented December 23, 1958, for Method and Apparatus for Loading a Water Vessel.

An object of the present invention is the provision of a method and apparatus for loading a water vessel.

Another object is to provide a method and apparatus for loading of a water vessel with a minimum amount of time and equipment.

A further object of the invention is the provision of a method and apparatus for loading of a water vessel that stows the apparatus in the vessel when not in use.

A still further object of the invention is the provision of an apparatus for transporting stores through various parts of a water vessel.

Other objects and many of the attendant advantages of this invention will be readily appreciated as the same becomes better understood by reference to the following detailed description when considered in connection with the accompanying drawings wherein:

FIG. 2 shows a side elevation of a dolly used for transporting a store;

FIG. 3 is a perspective view of said dolly;

Figure 1:
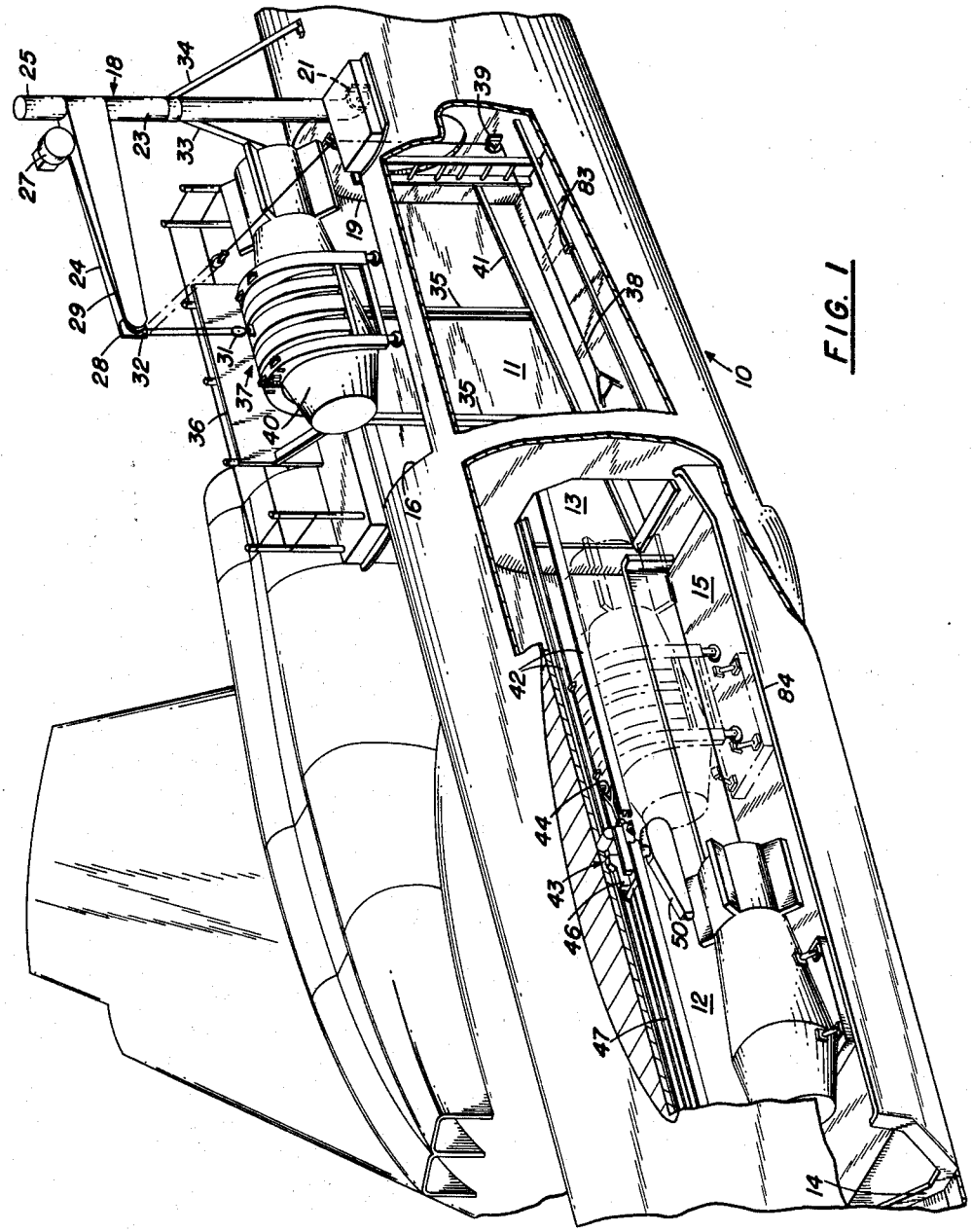
FIG. 1 shows a perspective view of a portion of a seaplane with parts broken away to disclose a loading compartment and a bay.

Referring now to the drawings, wherein like reference characters designate like or corresponding parts, there is shown a portion of a seaplane 10 having a loading compartment 11 communicating with a bay 12 by passage way 13 which is the same structural arrangement disclosed in the above mentioned application to Rudolph A. Matheisel.

The hull of the seaplane 10 is provided with an opening 14 which is connected with the bay 12. The opening 14 is closed by a rotary (bomb) bay door 15 of the type disclosed in Patent No. 2,634,656 issued to Wollens et al., April 14, 1953.

The compartment 11 is easily accessible by means of a loading hatchway 16 which is normally closed by a hatch (not shown).

A loading crane 18 includes a mast 23 pin connected at its lower end to a fitting 21 affixed to bulkhead 19; a boom 24 is rotatably mounted on the upper end of mast 23, and can be rotated by a gear box 25 actuated by a hand crank (not shown).

The boom 24 has a motorized winch 27 and a pulley 28 mounted thereon. The motorized winch 27 is remotely controlled by any suitable means (not shown). A cable 29 is fixed at one end to the winch 27, runs around pulley 28, supports a pulley 31, and is anchored at its other end to the boom 24 by a pin 32. A second cable 38 is affixed to pulley 39 on the floor of compartment 11 for a purpose described hereinafter.

Struts 33 and 34 are pivotally connected to the mast 23 by a pin (not shown). When the loading crane 18 is in the erect position, as shown, the lower ends of the struts 33 and 34 are anchored in fittings (not shown).

Guide rails 35 attached to a panel 36 are provided on one side of the compartment 11. A dolly 37 is adapted to slide along said guide rails 35 by means to be described in detail below. The dolly carries a store 40 and the dolly and store are lowered into the compartment 11 until they come to rest on the store loading tracks 41.

Overhead tracks 42 are provided in the top of the bay 12 and a towing link system 43 is mounted to run thereon to pull the stores 40 to their proper position on the door 15. The tow link system 43 is comprised of a linkage 44 adapted to be conected to a forward bracket 45 (FIG. 3) on the dolly 37, a traversing crane 46 towed by a pulley system 47, and a nosing 50 to hold the store in position.

Figure 6:
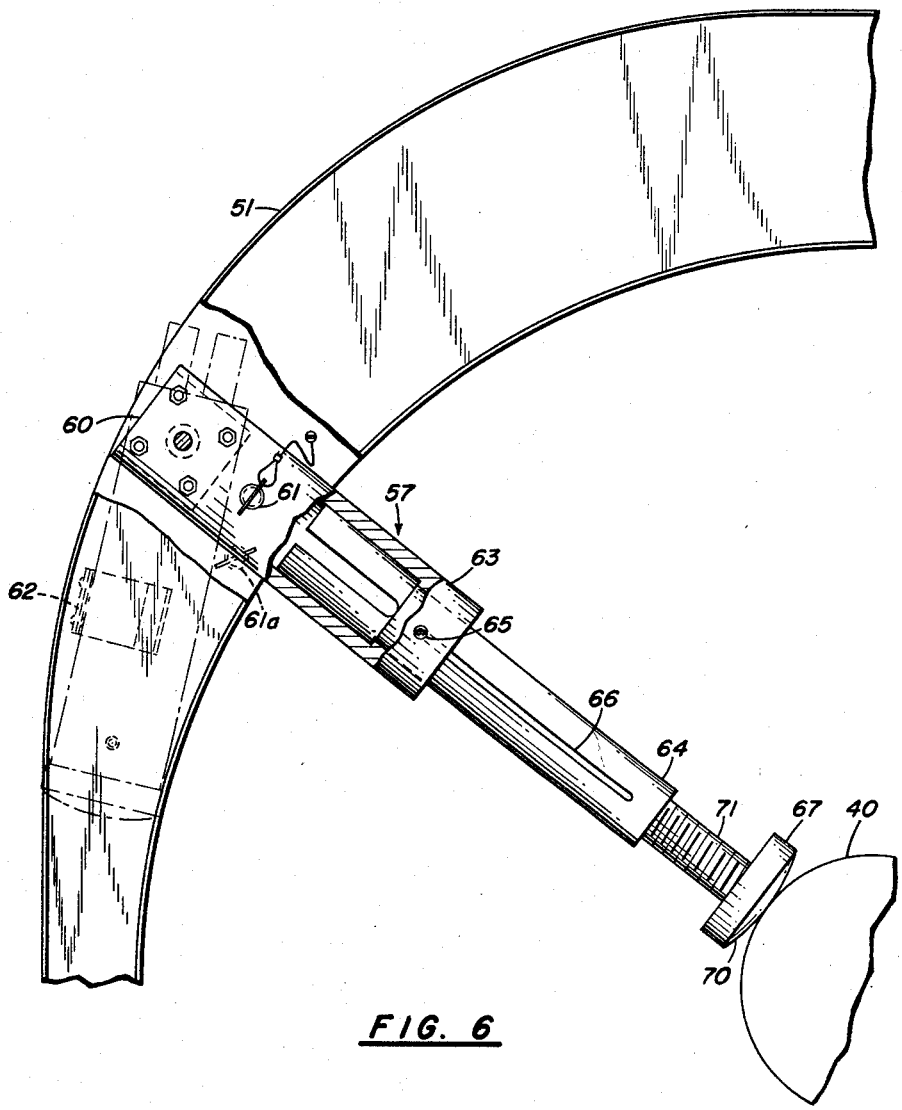
FIG. 6 shows a detail of the chock assembly of FIG. 5.

The dolly 37, best shown in FIGS. 2 and 3, is comprised of a roof 51 of general semi-cylindrical shape and having a plurality of frames 52 and legs 53 having lower rollers 54 attached thereto. Side rollers 55 are provided adjacent the lower rollers 54 for a purpose to be described below. Two sets of upper rollers 56 are affixed to the roof 51. A plurality of chock assemblies 57, shown in FIG. 6, are attached to the inner portion of the dolly roof 51 by a pivoting bracket 60 and is held in one of two pivotal positions by a ball-lock-pin 61, 61a inserted through the chock. The chocks 57 may be stowed between the frames 52 adjacent a clip 62 when the diameter of the store 40 is at a maximum. The chock is formed of a hollow cylinder 63 having a second internally threaded cylinder 64 slidably engaged within said first cylinder 63. A nut 65 on the outer cylinder is adapted to engage an elongated slot 66 on the cylinder 64 for adjustable positioning. For positive contact with the store 40, a bolt 67 is provided having a circular top surface 70. A threaded shaft 71 on the bolt 67 is connected to the slotted hollow cylinder 64. Thus, the chock may be adjusted over a wide range by the use of the nut 65 and slot 66 with a final close adjustment made by means of the threads 71. As shown in phantom lines in FIG. 6, the chock may be placed in fully closed position and stored between the frames.

As best shown in FIGS. 2 and 3, a pair of shafts 72 are routed through the entire dolly length, one shaft on each side. Each shaft passes through a gear box portion 73 of a hoist assembly. By means of cranks 74 placed on each end of each shaft, a drum 75 within the hoist assembly is rotated. The drum 75 contains a suspension cable 76.

Figure 5:
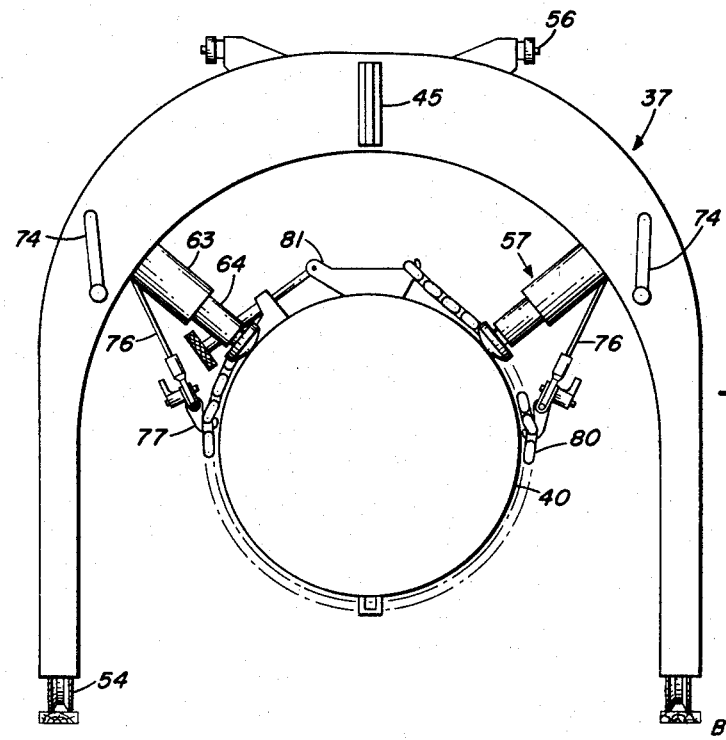
FIG. 5 shows a second means of attaching the store.

Referring to FIG. 5, it is seen that the cable 76 on each side of the dolly has a hook 77 on its end. A hoisting sling 80 placed on the underside and through the center of gravity of the store 40 is held in place by the hooks 77. A bracket means 81 consisting of a two element separable connector permits tightening of the sling 80 to accommodate the particular diameter of the store. After installation of the sling under the store, cranks 74 are rotated, thereby lifting the store by means of the hooks 77 attached to the drawn cable 76.

Upon lifting of the store to the desired elevation and into contact with the chocks 57, the dolly and store may be moved where desired.

Figure 4:
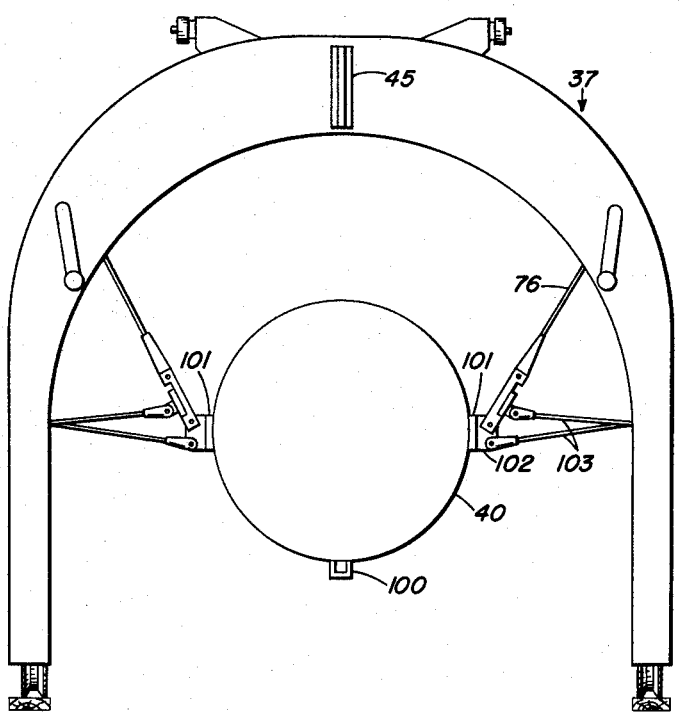
FIG. 4 is a front view of the dolly showing a means of attaching a store to said dolly.

FIG. 4 illustrates a second embodiment of an attaching means between the dolly 37 and store 40. The dolly shown is the same as that described previously except that sway brace cables 103 are provided in lieu of a chock assembly. As shown in FIG. 4, suspension lugs are provided on the outer periphery of the store. One pair of lugs 100 faces the ground and the remaining two sets of lugs 101 are spaced at a 90° interval from said first pair 100. An adapter 102 is installed on each pair of lugs 101, said adapter consisting of an elongated bar which is pin-connected at its ends to the lugs 101. With the dolly 37 placed directly over the store 40, the dolly hoist cable 76 is attached to a central lug 101 on each side of the store. Sway brace cables 103 are then attached to each side both fore and aft of the store. The dolly and store are then ready for movement.

Referring again to FIG. 1, when the seaplane 10 is to be loaded, the apparatus shown is operated in the following manner: The hatch cover for hatchway 16 is removed; the loading crane 18 is erected; a store 40, properly placed within a dolly 37, is picked up by means of the pulley system described above and a hook is inserted through an aperture in a bracket 82, said bracket being mounted on the roof of the dolly. Upon lowering of the dolly and store into the hatch, side rollers 55 contact the side guide rails 35 to guide the dolly into place. Upon reaching the bottom of the loading compartment 11, the lower rollers 54 come into contact with inclined loading tracks 41. The cable 38 is then attached to the dolly and the slack in said cable is taken up until the dolly rests against stops 83. At this point, the side guide rails 35 are removed, thus permitting the dolly to travel along the tracks 41 until the upper rollers 56 come into contact with the overhead tracks 42. The towing link system 43 then is attached to the bracket 45 on the forward end of the dolly and the dolly is pulled to store location. When in proper position, the store 40 is lowered by extending the cable 76 by operation of the cranks 74 and placed on a platform. This procedure is continued until the door 15 is fully loaded.

Figure 7:
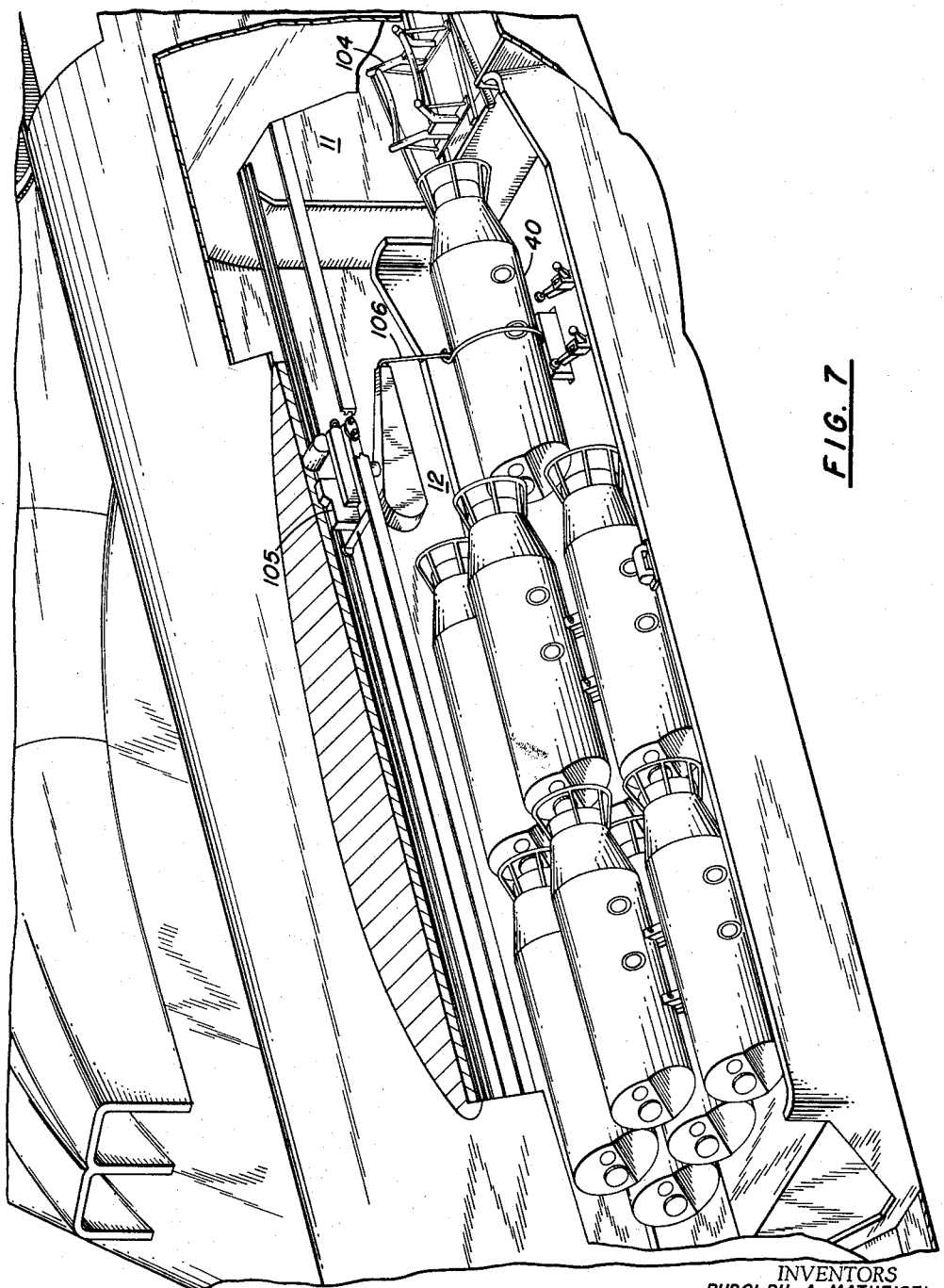
FIG. 7 illustrates a perspective view with parts broken away of another embodiment of the bay.

Another method of placing the stores within the bay is shown in FIG. 7. After the dolly and store are brought into the loading compartment 11, the dolly is lowered until it comes directly over a store loading cradle 104, said cradle comprised of metallic tubular members formed to the contours of the main body of the store. The store 40 is lowered into the cradle 104 and is then released from the dolly; thus the dolly is ready to be returned to pick up another store. The store 40 is then lifted by a traversing crane 105 and brought into the bay 12 by means of a sling 106 brought about the center of gravity of the store. In this manner, the store may be suspended above the bay floor for the purpose of arming and later placed in final position in the bay. The procedure is repeated until all stores are loaded.

Obviously many modifications and variations of the present invention are possible in the light of the above teachings. It is therefore to be understood that within the scope of the appended claims the invention may be practiced otherwise than as specifically described.

What is claimed is:

1. In a system for loading a water vessel having a loading compartment accessible by a hatchway, a bay connected with said compartment, first crane means pivotally mounted in said compartment for loading stores, a first track means removably mounted vertically on the side of the compartment, a second track means mounted at the lowermost end of said first track means and extending to said bay, a third track means horizontally mounted in the overhead of said bay, and second crane means movably mounted in said bay, the combination with said water vessel of a dolly of inverted U-shaped cross section having top and sides, a first roller means mounted on said dolly being formed to engage a first track, a second roller means mounted adjacent said first roller means being formed to engage a second track, a third roller means fixedly secured to the top of said dolly being formed to engage a third track whereby said dolly is capable of both vertical and horizontal movement when said roller means engage their respective tracks alternately, a plurality of lengthwise shafts positioned in said dolly adjacent the junction of said sides and top, a drum mounted adjacent each shaft on said dolly, a cable wound on each drum, attachment means on the end of each cable, means between said shaft and said drum for rotating said drum and a flexible band adapted to be connected to said cable attaching means whereby a store may be lifted and positioned within said dolly.

2. The device described in claim 1, wherein said flexible band has diametrically opposite chain-link sections for attaching the supporting cable, and also including a two-element separable connector located between the chain-link sections, one element having connection to one end of said flexible band and the other element connected to the other end of the flexible band and screw means for closing said separable connector and tightening said flexible band.

3. The device described in claim 2, including a plurality of chock assemblies, said assemblies being mounted internally of said top of said dolly and extending downwardly to contact with the store, each of said assemblies being comprised of a hollow first cylinder rotatably mounted on said dolly, a second hollow cylinder mounted within said first cylinder, said second cylinder having an elongated slot along its longitudinal axis, a nut mounted on the outer periphery of said first cylinder and inserted within said elongated slot for axial adjustment between said first and second cylinders, a threaded bolt positioned with said second cylinder and having a head which is adapted to compressively engage a store so as to prevent swaying movement of said store, said cylinders and bolt being adapted to telescopically fit within each other.

4. In combination with a water vessel having a loading compartment accessible by a hatchway, a bay connected with said compartment, first crane means pivotally mounted in said compartment for loading stores, a first track means removably mounted vertically on the side of said compartment, a second track means mounted at the lowermost end of said first track means and extending to said bay, a third track means horizontally mounted in the overhead of said bay, second crane means movably mounted in said bay, a dolly having a reinforced inverted U-shaped shell, said shell having a top portion which is arcuately shaped, said top portion being supported by sides, an inner area of said shell being circumscribed by the inner face of said top portion and the inner faces of said sides, the cross section of said inner face of the top portion of said shell being semi-circular in shape, a first roller means mounted on the bottom portion of said sides and being formed to engage said first track means, a second roller means mounted adjacent said first roller means and being formed to engage said second track means. a third roller means fixedly secured to the top of said dolly and being formed to engage said third track whereby said dolly is capable of both vertical and horizontal movement when said roller means engage their respective tracks alternately, lifting means mounted on said shell whereby stores can be lifted and brought into juxtaposition with the inner face of said shell, positioning means operably associated with said lifting means for positioning and preventing sideward movement of said stores within said inner area, said positioning means being mounted on said shell so that the positioning means can be moved in and out of said inner area.

5. The device as claimed in claim 4 said lifting means comprising at least one shaft extending longitudinally through said shell, a drum operably associated with said shaft and mounted on said shell so as not to project within said inner area of the shell, a cable attached to said drum and adapted to be attached to said stores and means for rotating said shaft whereby stores can be lifted by said cable.

6. The device as claimed in claim 5 said positioning means comprising a hollow first cylinder rotatably mounted on said shell, a second hollow cylinder mounted within said first cylinder, said second cylinder having an elongated slot along its longitudinal axis, a nut mounted on the outer periphery of said first cylinder and inserted within said elongated slot for axial adjustment between said first and second cylinders, a threaded bolt positioned within said second cylinder and having a head which is adapted to compressively engage a store, said cylinders and bolt being adapted to telescopically fit within each other.

7. The device as claimed in claim 4 said positioning means comprising at least two sway brace cables mounted on said shell and adapted to be attached to said stores.

References Cited in the file of this patent

UNITED STATES PATENTS

| | | |
|---|---|---|
| 727,651 | Loetscher | May 12, 1903 |
| 965,806 | Furnberg | July 26, 1910 |
| 1,645,485 | Hardacker | Oct. 11, 1927 |
| 2,262,937 | Holmes | Nov. 18, 1941 |
| 2,529,948 | Jones | Nov. 14, 1950 |
| 2,552,578 | O'Mara et al. | May 15, 1951 |
| 2,670,859 | Zeckendorf et al. | Mar. 2, 1954 |
| 2,826,960 | Schiavi | Mar. 18, 1958 |
| 2,865,518 | Matheisel | Dec. 23, 1958 |

FOREIGN PATENTS

| | | |
|---|---|---|
| 575,651 | Great Britain | Feb. 27, 1946 |